United States Patent [19]

Morikawa

[11] Patent Number: 5,119,136
[45] Date of Patent: Jun. 2, 1992

[54] ORIGINAL SCANNING APPARATUS

[75] Inventor: Takeshi Morikawa, Osaka, Japan

[73] Assignee: Minolta Camera Kabushiki Kaisha, Osaka, Japan

[21] Appl. No.: 448,711

[22] Filed: Dec. 11, 1989

[30] Foreign Application Priority Data

Dec. 13, 1988 [JP] Japan .................. 63-315528
Dec. 13, 1988 [JP] Japan .................. 63-315530

[51] Int. Cl.⁵ .................................. G03G 15/28
[52] U.S. Cl. ..................................... 355/235; 355/67; 355/208; 355/233
[58] Field of Search ............... 355/233, 235, 228, 232, 355/67, 208; 358/497

[56] References Cited

U.S. PATENT DOCUMENTS

| | | | |
|---|---|---|---|
| 4,287,461 | 9/1981 | Promis et al. | 355/235 X |
| 4,371,254 | 2/1983 | Beery | 355/235 |
| 4,540,927 | 9/1985 | Tanimoto | 355/235 X |
| 4,561,771 | 12/1985 | Sugiura | |
| 4,568,171 | 2/1986 | Ikenoue | |
| 4,586,808 | 5/1986 | Tanimoto et al. | 355/235 |
| 4,693,595 | 9/1987 | Kunikawa et al. | 355/235 X |
| 4,731,657 | 3/1988 | Miyagi | 358/497 |
| 4,748,555 | 5/1988 | Miyake et al. | 355/233 X |
| 4,954,863 | 9/1990 | Harada et al. | 355/235 X |
| 4,963,934 | 10/1990 | Nezu | 355/235 |

FOREIGN PATENT DOCUMENTS

| | | | |
|---|---|---|---|
| 3530842 | 3/1986 | Fed. Rep. of Germany | 355/235 |
| 55-163560 | 12/1980 | Japan . | |
| 0051830 | 3/1985 | Japan | 355/235 |
| 0059320 | 3/1986 | Japan | 355/235 |
| 0059322 | 3/1986 | Japan | 355/235 |
| 0126542 | 6/1986 | Japan | 355/235 |
| 0129837 | 6/1987 | Japan | 355/235 |
| 0223436 | 9/1989 | Japan | 355/235 |

Primary Examiner—A. T. Grimley
Assistant Examiner—Matthew S. Smith
Attorney, Agent, or Firm—Price, Gess & Ubell

[57] ABSTRACT

A pulse corresponding to the rotation of a motor which moves a scanning system of an original scanning apparatus in a reciprocating motion is counted by a counter each time when the scanning system is operated in the forward and backward movement. By a software control which is performed basing on the counted value, a time period to start braking the scanning system at a practical position in the returning movement is obtained to stop the scanning system at its home position. In order to obtain a desired speed, a duty ratio of a pulse for applying electricity to a motor is controlled from a pulse which corresponds to the rotation of the motor being operated and a pulse width corresponding to the rotation of the motor when it is driven at a desired speed.

12 Claims, 10 Drawing Sheets

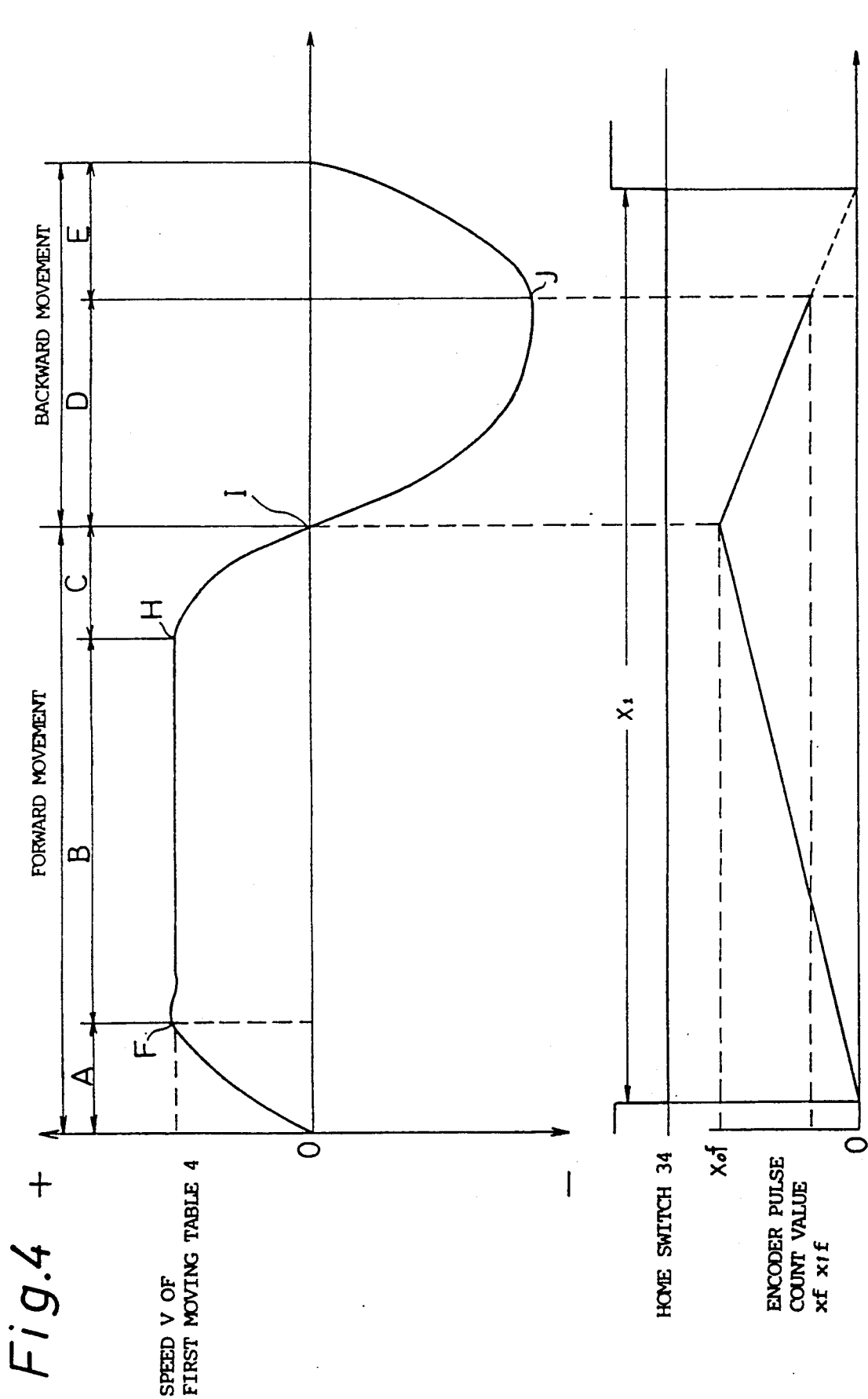

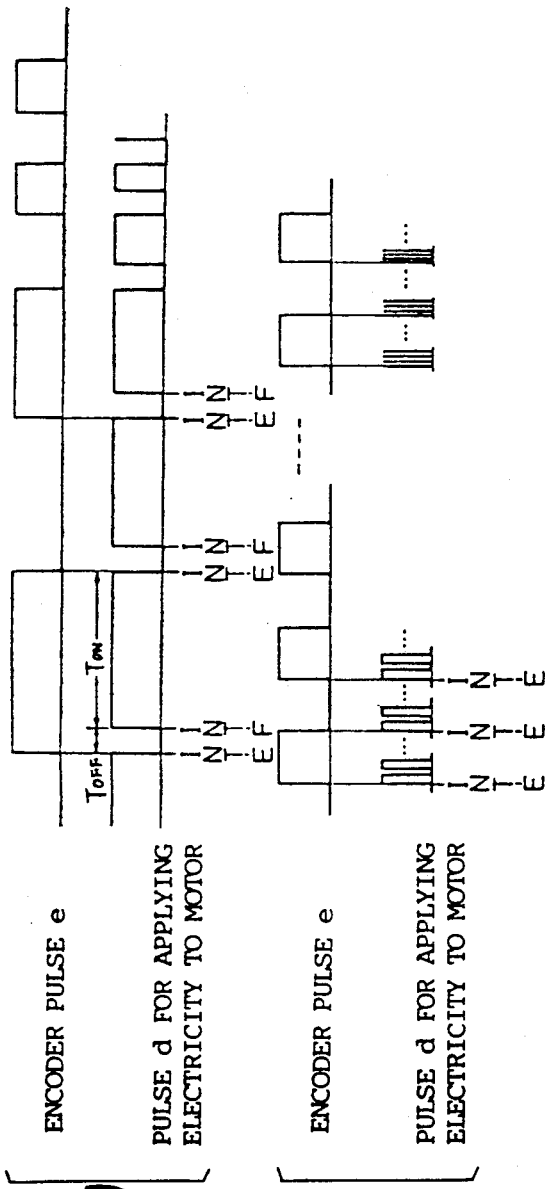
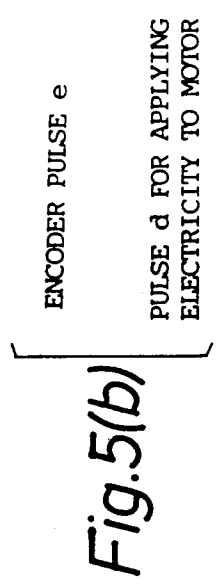
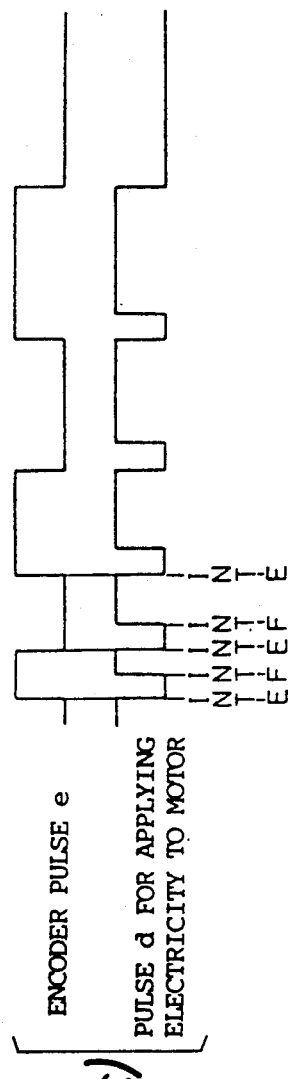
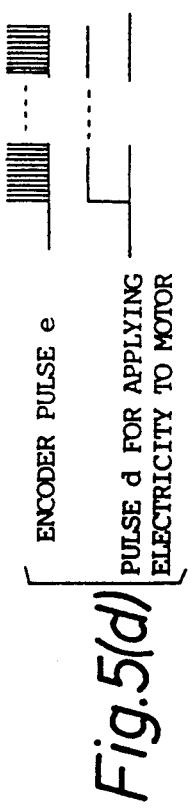

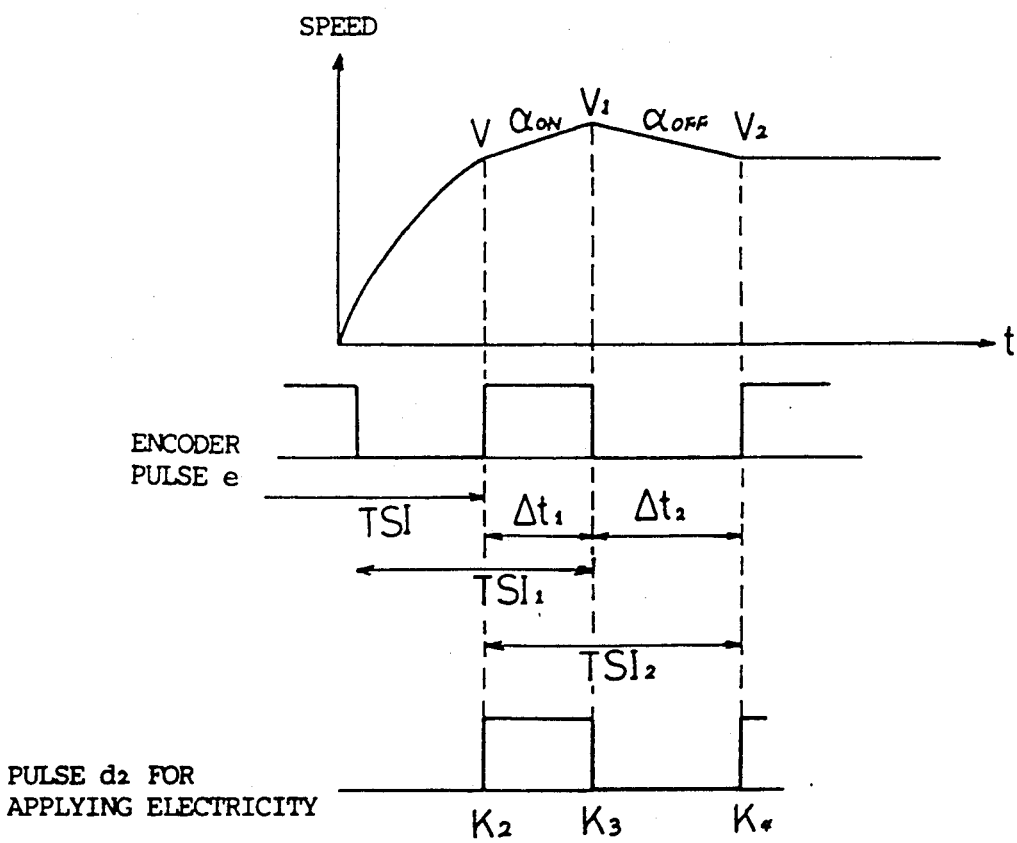

ORIGINAL SCANNING APPARATUS

BACKGROUND OF THE INVENTION

1. Technical Field of the Invention

The present invention relates to an image scanning apparatus for use in a copying machine or image reader, and more particularly, to an image scanning apparatus for exposing an image or reading an image by scanning an original when a scanning system which is driven in reciprocating motion by a motor is moved forward.

2. Description of Related Art

Nowadays, high-speed operation is more and more required for copying machines and image readers. It is thus desired to reduce the time of operation by the scanning system when a multiplicity of copies are produced from one original or when a multiplicity of originals are successively scanned. In order to satisfy the requirement, a motor which is a driving source is adapted to cause the scanning system to perform backward movement at high speed with full power when it is not engaged in a scanning operation. Accordingly, it is difficult to accurately stop the scanning system at its home position when it is moved backward.

In U.S. Pat. No. 4,561,771 and U.S. Pat. No. 4,568,171, there are disclosed original scanning apparatuses capable of solving the problem. In those apparatuses, there is provided a brake switch at a predetermined position in front of the home position of the scanning system, and when the scanning system has reached the position where the brake switch is actuated during backward movement of the scanning system, brake is applied to the motor with the action of the brake switch so as to stop the scanning system accurately at its home position. In this method, however, an extra switch with its wiring is necessary in addition to a switch which is arranged at a fixed position for detecting a scan start position of the scanning system thereby causing a rise in manufacturing cost.

Japanese Patent Publication TOKKAI SH055-163560 discloses a return control method by a software control for stopping the scanning system at its home position when it is operated for backward movement, wherein the scanning system is moved backward for a certain period of time and the amount of displacement occurred in the period is measured by which a brake is actuated with a driving force corresponding to the amount of the displacement to stop the scanning system. When such software control is applied, complication in mechanical structure can be avoided. However, the amount of movement of the scanning system is not measured directly from the time of operation, and it can not cope with a change in the amount of movement of the scanning system with respect to a change in load arising from changes in curvature of mirror and aged deterioration of bearing and adhesion of dust in the scanning system. Accordingly, the scanning system can not be stopped accurately at a predetermined position at all times.

Further, a motor has to be controlled to be driven at a constant speed since it drives a structure which is required to be moved at a fixed speed like the scanning system which scans original image in a copying machine. For controlling the speed of the motor, a method is adopted in a well-known conventional device, wherein the frequency voltage of an encoder pulse which synchronizes with the rotation of the motor is converted to compare with a standard voltage which corresponds to a desired speed and is amplified to make it as a signal for turning on electricity through a further pulse width modulation process. Another method is also adopted in which an encoder pulse which synchronizes with the rotation of the motor is inputted into a calculation means to calculate it for comparison in order to obtain a signal for turning on electricity which synchronizes with the encoder pulse for controlling the speed of the motor.

However, in these methods, the timing for applying electricity to the motor is synchronized with an encoder pulse synchronously generated with the rotation of the motor, and low-frequency noise is produced since the pulse width of the encoder pulse under maximum magnification becomes longer especially in a copying machine which is capable of changing magnification. Different pulse widths of the encoder pulse according to different magnifications offend the ear since low-frequency noise in different sounds are produced corresponding to the magnifications. Further, the speed of the motor can not be controlled closely because of long duration of period in applying electricity, and the constant speed control tends to become unstable.

SUMMARY OF THE INVENTION

A primary object of the present invention is to provide an image scanning apparatus which is capable of solving the above-mentioned problems inherent in the conventional apparatus, by making use of a pulse generating means adapted to correlatively act with a motor for controlling the operation of a scanning system for control of braking operation when the scanning system is moved backward, wherein the actual amount of displacement both in forward and backward movements of the scanning system is obtained as a direct pulse signal without providing any specific member, and basing on the data obtained, a brake is always actuated in a proper timing when the scanning system is moved backward by a software control.

A second object of the present invention is to provide an image scanning apparatus which is capable of properly performing various controls of the motor for accomplishing the first object of the present invention, wherein the counting method of a count means for counting a pulse corresponding to the rotation of the motor which reciprocates the scanning system is different when the scanning system is moved forward and when it is moved backward, and even if the speed of the scanning system is different when it is moved forward and backward because of a high speed returning action, the counting can be performed accurately in either case of the movement.

A third object of the present invention is to provide an image forming apparatus which is capable of decreasing noise and improving the stability in constant speed control by freely setting frequency of the pulse for applying electricity to the motor, wherein the speed of the motor is judged by an encoder pulse which is synchronously generated with the rotation of the motor, and in accordance with the result of the judgement, the duty ratio of a pulse to be applied to the motor, which is different from the encoder pulse, is controlled for controlling constant speed of the motor.

These and other objects and features of the present invention will become more apparent from the following description taken in conjunction with the accompanying drawings which illustrate specific embodiments of the invention.

BRIEF DESCRIPTION OF THE DRAWINGS

FIG. 4 shows a velocity diagram of a first moving table for a scanning operation and a corresponding time chart of a home switch with a count variation diagram of encoder pulse.

FIGS. 5(a) through 5(d) show diagrammatic views of encoder pulses at various time control points when the first moving table is in reciprocating motion and a signal for turning on electricity based on the encoder pulse.

FIG. 8 is a diagrammatic view explaining a method of how to detect each accelerated velocity when electricity is turned on and off at a desired velocity point in the scanning operation.

DESCRIPTION OF THE PREFERRED EMBODIMENT

An embodiment of the present invention which is applied to a copying machine will now be described below referring to accompanying drawings.

Figure 1:
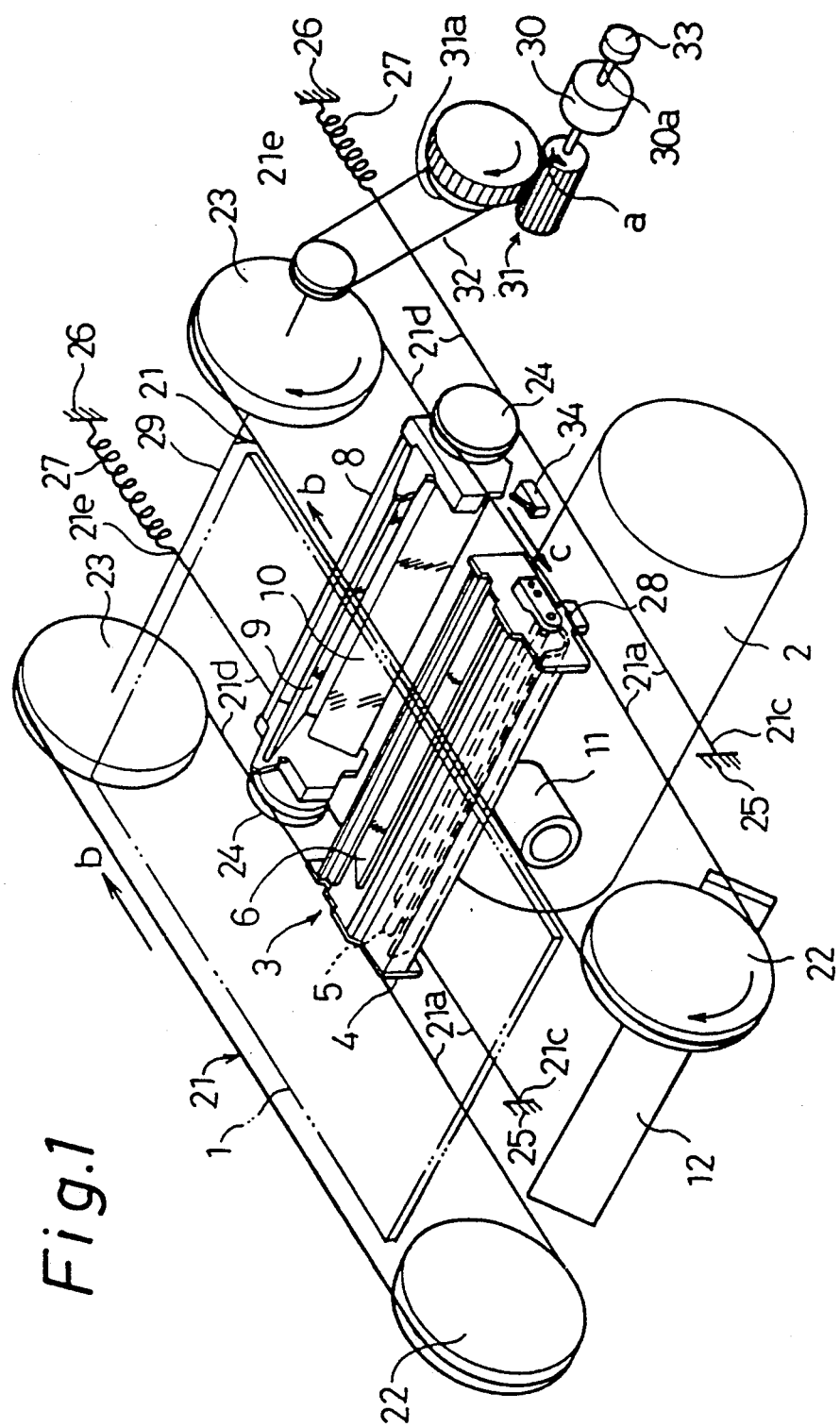
FIG. 1 is a perspective view of an image forming section showing an embodiment of the present invention as applied to an optical system moving type copying machine.

FIG. 1 shows a schematic view of an image forming section in the copying machine. Between an original table 1 and a photoconductive drum 2 which is arranged under the table, there is provided a scanning optical system 3. The scanning optical system 3 comprises an illuminating lamp 5 and a first mirror 6 held on a first moving table 4 which acts as a scanner, and a second and third mirrors 9,10 held on a second moving table 8, a projection lens 11 and a fourth mirror 12.

A pair of driving wires 21 are stretched at both side portions in which the first moving table 4 and the second moving table 8 are moved. Each driving wire 21 is run around pulleys 22 and 23 which are of the same diameter, and the portion 21a of the wire on the side of the pulley 22 is further run around a pulley 24 provided on the outer end plate of the second moving table 8 and the end 21c of the wire is fastened to a fixed member 25. The portion 21d of the wire on the side of the pulley 23 is further run around the pulley 24 of the moving table 8 and the end 21e of the wire is fastened to a fixed member 26 through a tension spring 27. Each of the wires 21 is also fastened to the first moving table 4 at a portion between the pulley 22 and 24. The reference numeral 28 represents the portion where the wire is fastened to.

A DC motor 30 is connected to a pivot 29 of the pulley 23 through reduction gear 31 and timing belt 32. An encoder 33 is connected with a pivot 30a of the motor 30 to generate a pulse in synchronization with the rotation of the motor 30.

When the motor 30 is operated in the direction of arrow a, the wire 21 is driven in the direction of arrow b. At this time, the first moving table 4 which is directly fastened to the wire 21 is moved at the same speed V/M as that of the wire 21 (V: peripheral speed of the drum 2: magnification) to scan the image of an original placed on the original glass table 1 within a range corresponding to a copy size and magnification, and the image of the original is successively exposed through a slit onto the photoconductive drum 2 by the first to fourth mirrors 6,9,10,12 and the projection lens 11. At this stage, the second moving table 8 is moved at the velocity of V/2M through the pulley 24 in the direction of arrow c since the portion 21a of the wire on the side of the pulley 22 is shortened when the wire 21 is driven in the direction of arrow b and the portion 21d of the wire on the side of the pulley 23 becomes longer, and constant light exposure length of the scanning system 3 is maintained when a scanning operation is performed.

Around the photoconductive drum 2, there are disposed an unillustrated eraser lamp, charger, developing unit, transfer charger and cleaning device, and an electrostatic latent image is formed on the surface of the drum uniformly charged by the charger receiving the exposure. The electrostatic latent image is developed by the developing unit to produce a toner image which is then transferred by the transfer charger onto a transfer material synchronously transported thereto.

After the transfer process, the toner which remains on the surface of the photoconductive drum 2 is removed by the cleaning device, and thereafter, the remaining electric charge is removed by the eraser lamp. An alteration of magnification is conducted, for instance, through adjustment of conjugate length by moving the projection lens 11 or the like in the direction of the optical axis.

At the time when the scanning operation is finished, the motor 30 is reversely rotated, by which the wire 21 is driven in the direction opposite to the arrow b, and the first and second moving tables 4,8 are moved in the opposite direction of the arrow c to return to their home positions.

Figure 2:
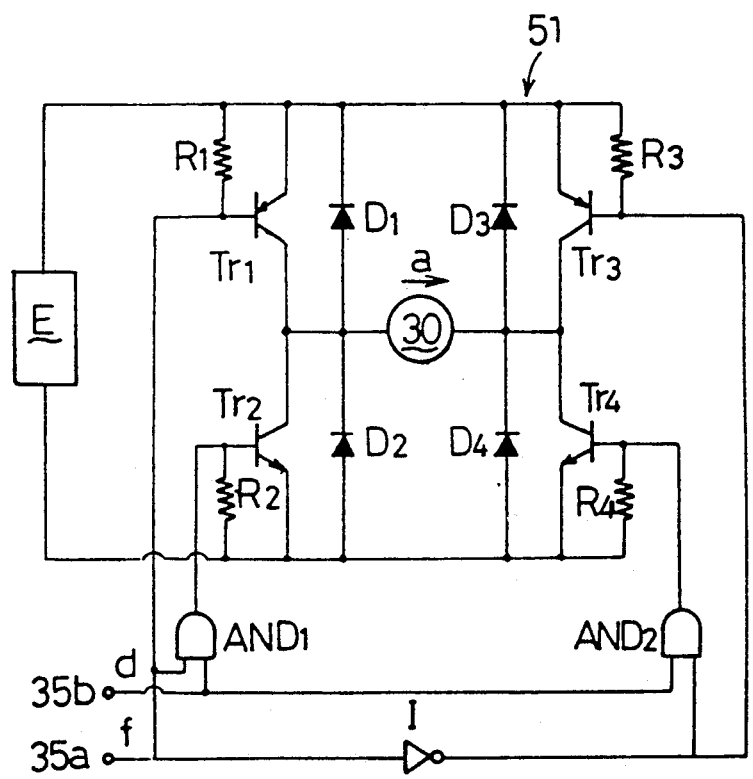
FIG. 2 shows a driving circuit diagram of a driving motor in a scanning optical system.
Figure 3:
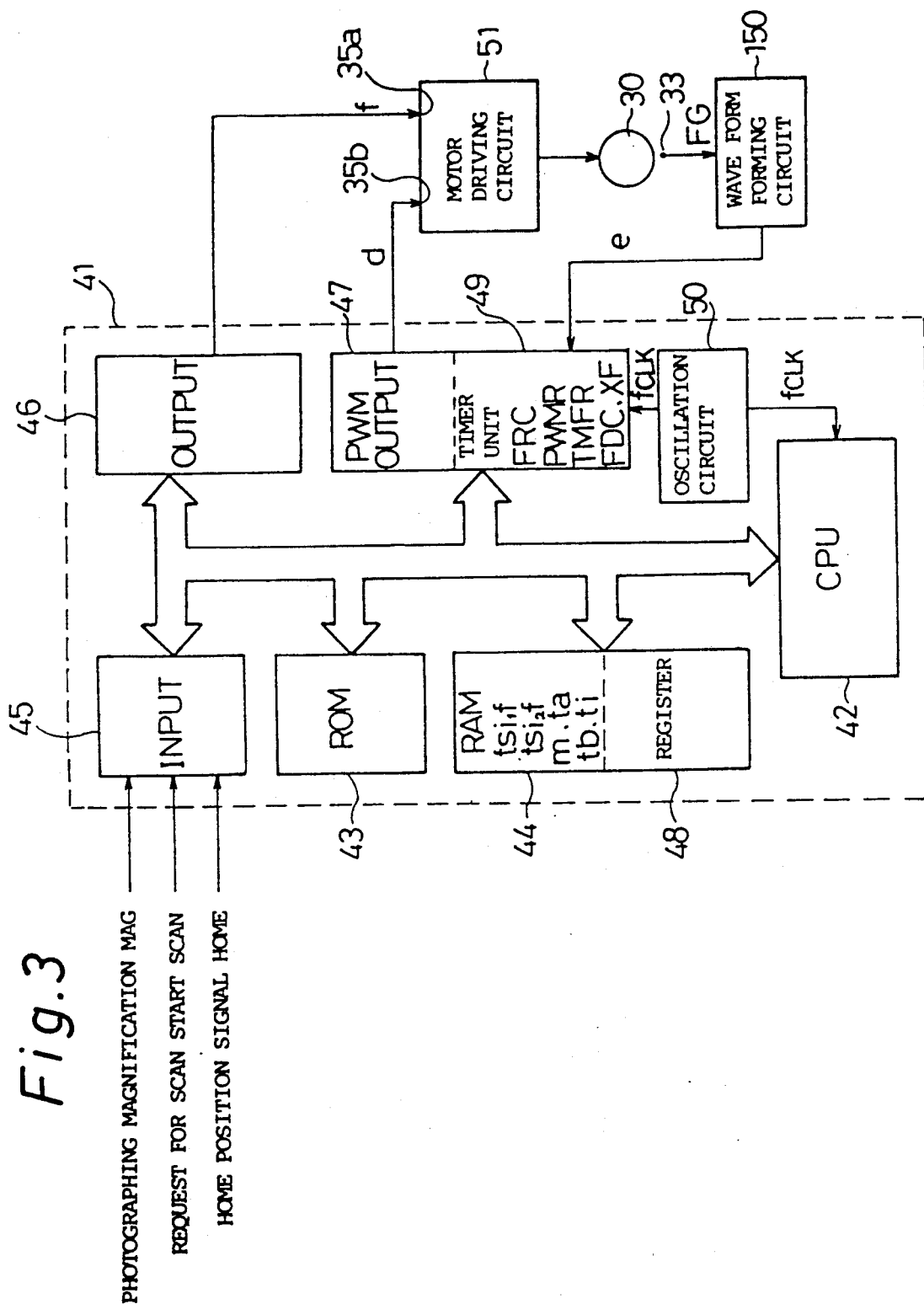
FIG. 3 shows a control circuit diagram which controls the driving circuit.

In order to control the movement of the scanning optical system 3, the motor 30 is driven by a driving circuit illustrated in FIG. 2 and is controlled by a control circuit shown in FIG. 3. For carrying out the control, a switch 34 is provided on the moving path of the first moving table 4 for detecting whether the scanning optical system 3 is at its home position or not, and is pressed when the first moving table 4 is at the home position.

The driving circuit illustrated in FIG. 2 will now be described.

A direct current power source E is connected to the motor 30 through four switching transistors Tr1-Tr4 which are bridged. The transistors Tr1 and Tr3 are arranged to be turned on when a base voltage is "low", while the transistors Tr2 and Tr4 are arranged to be turned on when the base voltage is 'high', and according to combination of the conditions of on and off, the motor 30 is properly rotated regularly or reversely, or stopped.

To the transistors Tr1–Tr4, respective diodes D1–D4 are connected in parallel to form a bypath for the time when counter electromotive voltage is generated. To an input terminal 35a, a "high" signal as a signal for regular rotation or "low" signal as a signal for reverse rotation is inputted, and the terminal is connected to input side of $AND_1$ of AND gate and the base of the transistor Tr1, and is further connected with input side of $AND_2$ of the AND gate and the base of the transistor Tr3.

To another input terminal 35b, a "high" signal as a signal for turning on electricity by a pulse d to the motor or a "low" signal as a signal for turning off electricity is inputted, and the terminal is connected to input sides of $AND_1$ and $AND_2$ of the AND gate. Output side of $AND_1$ of the AND gate is connected with the base of the transistor Tr2 and output side of $AND_2$ of the AND gate is connected with the base of the transistor Tr4 respectively.

On and off conditions of each transistors Tr1–Tr4 by combination of the input signals to each input elements 35a,35b, on and off conditions of the motor 30, and regular and reverse movement of the motor when it is turned on are shown in a table 1 below.

TABLE 1

| Input Element | | Transistor | | | | Motor |
|---|---|---|---|---|---|---|
| 35a | 35b | Tr1 | Tr2 | Tr3 | Tr4 | 30 |
| Low | Low | On | Off | Off | Off | Off |
| High | Low | Off | Off | On | Off | Off |
| Low | High | On | Off | Off | On | On (reverse) |
| High | High | Off | On | On | Off | On (regular) |

Description will now be made of the control circuit shown in FIG. 3.

In the circuit, one chip microcomputer 41 (hereinafter called as Micon) is exclusively used for controlling the scanning optical system 3, and the micon is controlled by an unillustrated microcomputer (hereinafter called as Master) which controls other various actions of the copying machine.

The micon 41 is provided with CPU 42, ROM 43, RAM 44, input port 45, output port 46, PWM output port 47, register 48, timer unit 49 and oscillation circuit 50 for generating internal system clock fclk. The timer unit 49 is provided with, besides a counter XF for counting the encoder pulse e as a positional data of the first moving table 4, a frequency divider circuit FDC for counting the counter XF four by four each time when an interruption is occurred, wherein input of the encoder pulse e is divided into four to enable the interruption when the first moving table 4 is operated for a returning movement so that even if electricity is applied in full power and rotated at high speed during the returning movement, the counter XF is not required to perform counting until the edge of the encoder pulse e is detected four times. The output FG from the encoder 33 is made into a square wave in a waveform forming circuit 150 and inputted in the micon 41.

To the input port 45, photographing magnification signal MAG, scan start request signal SCAN and signal HOME for detecting whether or not the scanning optical system 3 is at a home position are given. The signal MAG shows a copying magnification to be selected in the copying machine, and a scanning speed corresponding to the magnification is set in the micon 41. The signal SCAN is made "high" when scan is to be started, and usually set at "low". The signal HOME is made "high" only when the scanning optical system 3 is at a home position, and is made "low" otherwise.

From the output port 46, signal f for regular/reverse rotation of the motor 30 is output and is then inputted into the input terminal 35a of the driving circuit 51 illustrated in FIG. 2 and inverted by the inverter I. From the PWM output port 47, motor pulses d are output, one of which is a PWM pulse train for controlling the constant speed scanning in which the system clock fclk oscillated from the oscillation circuit 50 and divided into 256 is used for pulse width modulation, and another of which is a pulse train being controlled for off time by interruption according to the timer set basing on each edge (FIG. 4) of on and off of the encoder pulse e in order to start a constant speed scanning of the scanning system 3 or to perform decelerated control until returning movement start after the constant speed control or to perform decelerated return control following the full power returning operation by setting a duty ratio of the pulse to 100%, and motor pulse d is then inputted in the input terminal 35b of the driving circuit 51 in FIG. 2. The motor 30 is thus controlled with the input operation mentioned above.

As illustrated in FIG. 4, the control includes controlling a condition of accelerated scanning A from the time when the scanning optical system 3 is started at the speed 0 to a desired speed V, to control a condition of constant speed scanning B in which scanning is made at a constant speed within a predetermined range after a desired speed V is attained, to control a condition of decelerated scanning C for reducing the speed of the motor 30 once to 0 in order to reversely move the scanning optical system 3 at the time when the constant speed scanning is finished, to control a condition of full power return D for returning the scanning optical system 3 by reversely rotating the motor 30 in full power, and to control a condition of decelerated return E for reducing the speed of the motor 30 to 0 by actuating a brake in order to stop the scanning optical system 3 which is being put under full power return condition D at its home position.

In the control of the accelerated scanning A, a "high" signal is inputted into the input terminal 35a, and the pulse train d for applying electricity is inputted (FIG. 5 (a)) to the input terminal 35b. On time Ton of the pulse train d is set as a period from termination of a fixed off time $T_{off}$, which is started from each on and off edge of encoder pulses provided corresponding to the rotation of the motor 30, to the next off and on edge of the encoder pulses. The start timing of the on time Ton is obtained by an internal interruption INT-F which interrupts the programmed proceeding of CPU 42 after a predetermined time measured from an interruption INT-E according to each on and off edge of the encoder pulse e. At an initial stage of the accelerated scanning A, the motor 30 is powerfully accelerated with a strong torque for the period of on time Ton sufficiently longer than the off time Toff of the motor 30 since the rotation of the motor 30 is slower and the interval of the encoder pulse e is longer.

With the speed being close to a desired speed V for conducting the constant speed scanning B, the interval of the encoder pulse e is shortened, and the ratio between the on time Ton and the off time Toff becomes small thus gradually reducing the acceleration in driving the motor 30.

Figure 6:
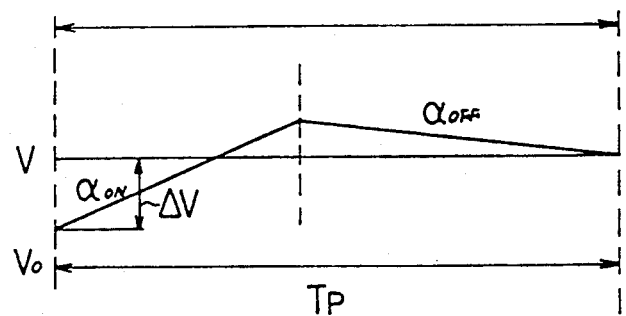
FIGS. 6 and 7 are diagrammatic views explaining how to set a duty cycle in one period of pulse when electricity is applied to a PWM motor.

When the desired speed V is attained at the F point shown in FIG. 4, it is judged by the micon 41 that the speed has reached the desired speed V from the interval of the encoder pulse e thereat. Based on this judgement, the control of the motor 30 is converted to the control of the constant speed scanning B, wherein the motor 30 is controlled for constant speed operation by making a PWM pulse as a pulse d for turning on electricity to the motor 30. Although, as it will be fully described later, an acceleration $a_{on}$ when electricity is applied and a deceleration (negative acceleration) $a_{off}$ when electricity is not applied are calculated, and thereafter, duty of the PWM motor pulse d is established on each encoder pulse by utilizing the above two values as parameters (FIG. 6). The timing for the establishment of the duty can only be obtained by the interruption INT-E of on and off of the encoder pulse e (FIG. 5 (b)). Accordingly, internal interruption INT-F is prohibited during this period.

The constant speed scanning can thus be accomplished, and the decelerated scanning (C) is performed upon reaching a scan finishing position. In this decelerated scanning (C), the input terminal 35a is converted to "low" in order to provide a braking force, and off time is controlled by a motor pulse d (FIG. 5 (c)) in the same manner as that of the accelerated scanning (A). Under the condition when the input terminal 35a is "low" and the input terminal 35b is "low", only the transistor Tr1 is turned on. At this stage, since the scanning optical system 3 is moved in the scanning direction, the shaft 30a of the motor 30 is rotated by this movement, and a counter electromotive voltage is generated in the direction opposite to the arrow a in a closed loop of the motor 30, diode D3 and the transistor Tr1 to brake the rotation of the motor 30 being rotated in the scanning direction a. This is what we call a regenerative brake.

On the other hand, under the condition when the input terminal 35a is "low" and the input terminal 35b is "high", the transistors Tr1 and Tr4 are turned on, and the current of the DC power source E flows in the direction of the arrow a to brake the motor 30 so as to rotate it in the returning direction. This is what we call a forced brake wherein the motor 30 is electrified to rotate in the direction opposite to the movement of the scanning optical system 3.

At an initial stage of the decelerated scanning (C) shown in FIG. 4, only the regenerative brake is operated since the interval of the pulse e of the encoder is shorter than the off time set. The braking force by the regenerative brake is comparatively weak and the scanning optical system 3 is gradually decelerated. When the deceleration is progressed and the interval of the encoder pulse e becomes longer than the off time, the forced brake is activated together with the regenerative brake and deceleration is made a strong brake.

When the interval of encoder pulse e becomes longer than a predetermined period, it enters into a return process shown in FIG. 4 (D), wherein electricity is always applied by keeping the input terminal 35b in a turned on state, i.e., by keeping the motor pulse d turned on so that it is fixed at "high" to shorten the returning time. The so-called full power return (D) is carried out (FIG. 5 (d)).

At this stage, the scanning optical system 3 is desired to be stopped accurately at its home position after it has returned with full power. In order to fulfill the object, it is changed to the decelerated return (E) from the full power return (D) at a position a little on this side of the home position. The timing for starting the decelerated return (E) is decided when a value is of reached a counter value xlf which corresponds to a distance from the home switch 34 to a position where a predetermined timing for start braking action (FIG. 4, point J), wherein the encoder pulse e is kept on up-counting by the counter XF of the timer unit 49 after the home switch is turned off with the scan start, and a position of the first moving table 4 being returned is obtained by down-counting from a counted value xof which is the value counted after the scanning was finished at the point I of the FIG. 4. The down-counting at this stage is conducted by a software process to perform the external interruption four times each when each edge of on and off of the encoder pulse e is detected four times.

When the count value becomes xlf, off time control is performed as in the case of the decelerated scanning (C) to stop at a home position. More particularly, the timer unit 49 of the micon 41 counts one fourth cycle of a system clock fclk inputted from the oscillation circuit 50 by a free run counter FRC as a basic clock, and generates an external interruption signal INT-E by a detection of each edge of on and off of the encoder pulse e, and judges a pulse width of the encoder pulse e with a count value captured in the register 48 from the free run counter FRC value at the time when detection is made to make it as a speed detection data.

Now, description will be made on the control of a constant speed scanning (B) by the PWM output port 47.

When a ratio of deceleration of the reduction gear 31 is designated as 1/Z and diameter of the driving pulley 31a as D, and a scanning speed Vp by the motor 30 at equal magnification is considered as a speed of the timing belt 32, the relation between the number of rotation Ro of the motor 30 and the speed Vp is expressed as:

$$R_0 = \frac{V_p \cdot 1/Z}{D \cdot \pi} \qquad (1)$$

Accordingly, when an encoder pulse width (one period) is designated as TSI and the number of encoder pulse per one revolution of the motor 30 as G, it can be shown as:

$$TSI = \frac{1}{GR_0} \qquad (1)'$$

The timer unit 49 produces and outputs a high level active pulse which corresponds to the value set in the PWM register PWMR at a frequency divided into 256 of the system clock fclk by the PWM register PWMR provided therewith. A resolving power of the PWM is $2^{12}$, and a duty ratio of the pulse width PWM duty is shown as:

$$PWM \text{ duty ratio} = \frac{PWMR \text{ Value}}{2^{12}} \times 100(\%) \qquad (2)$$

The timer unit 49 further produces the internal interruption signal INT-F when the value set in a register TMFR is counted by the TMF register TMFR.

When there is a difference $\Delta V$ as shown in FIG. 6 between a velocity when the acceleration is started by applying electricity to the motor 30 through PWM motor pulse d and a velocity when acceleration is terminated, if one period of the PWM motor pulse d is expressed by Tp and the ratio between the Tp and the on time when electric is turned on is expressed by Y respectively, the following equation is established in order to make a desired velocity V during a period of PWM motor pulse d.

$$a_{ON} \cdot Y \cdot T_F \Delta V = a_{ON} \cdot Y \cdot T_F - \Delta V$$

The Y thus becomes as:

$$Y = \frac{a_{OFF}}{a_{ON} + a_{OFF}} + \frac{\Delta V}{T_P(a_{ON} + a_{OFF})} \quad (4)$$

Figure 7:
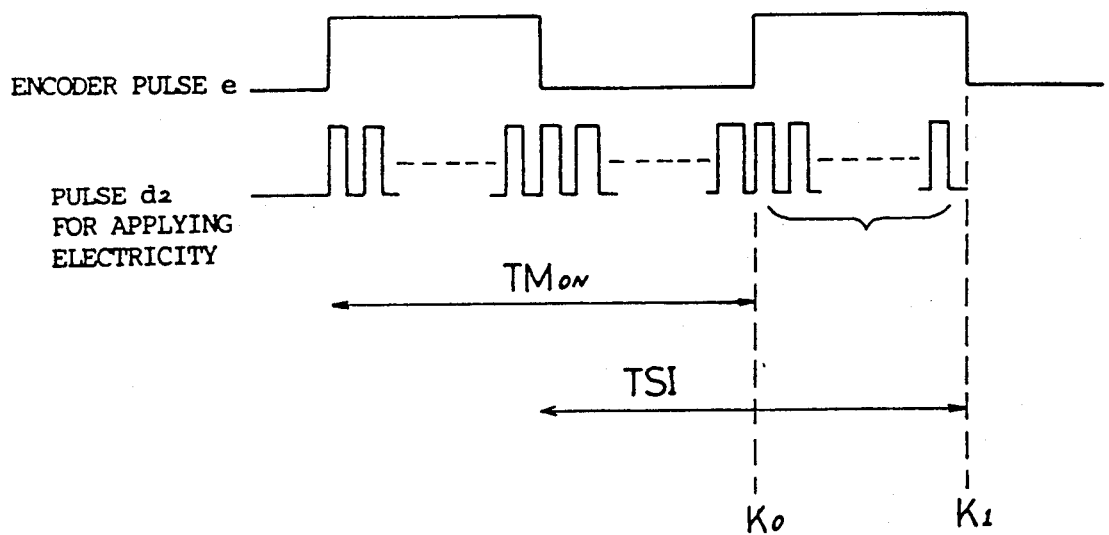

In FIG. 7, a case is considered when the external interruption INT-E of the encoder is produced at the time of Ko. If a speed error is assumed as $\Delta V$, in order to attain a desired speed V by the time $K_1$ at which the external interruption INT-E of next encoder is occurred when one period of the encoder pulse which corresponds to a desired speed V is expressed by TSI, the TSI approximates the time from the Ko to the K1 which is expressed by TSI/2, and the number N of PWM pulse d of the PWM motor is shown as:

$$N = \frac{TSI}{2} \times \frac{1}{T_P} \quad (5)$$

The speed error $\Delta V$ can, therefore, be corrected by a manner that the duty ratio adjustment expressed in the equation (4) is conducted to each fragment value which is obtained by dividing the speed error $\Delta V$ into N.

On ratio Y of the PWM motor pulse d at this time is:

$$Y = \frac{a_{OFF}}{a_{ON} + a_{OFF}} + \frac{2\Delta V}{(a_{ON} + a_{OFF}) \cdot TSI} \quad (6)$$

The speed error $\Delta V$ will be considered hereinbelow. When a speed detection is performed by judging an encoder pulse width e with the number of counts of the free run counter FRC between two external interruptions INT-E, and a measured pulse width at Ko point is designated as TMon and a desired pulse width as TSI respectively as shown in FIG. 7, a speed V at the time when a pulse width is TSI becomes as shown below from Ro and G, Vp in the equations (1) and (1)'.

$$V = \frac{1}{TSI} \cdot \frac{V_P}{GR_0} \quad (7)$$

Similarly, a speed Vo when a speed error is $\Delta V$ becomes, expressing a pulse width by TMon, as follows:

$$V_0 = \frac{1}{TM_{ON}} \cdot \frac{V_P}{GR_0} \quad (8)$$

The speed error $\Delta V$ is thus expressed as:

$$\Delta V = V - V_0 = \frac{TM_{ON} - TSI}{TM_{ON} \cdot TSI} \cdot \frac{V_P}{GR_0} \quad (9)$$

Accordingly, on ratio of the PWM motor pulse d becomes as shown below from the equation (6):

$$Y = \frac{a_{OFF}}{a_{ON} + a_{OFF}} + \frac{2}{a_{ON} + a_{OFF}} \cdot \frac{1}{TSI^2} \cdot \frac{V_P}{GR_0} \cdot \frac{TM_{ON} - TSI}{TM_{ON}} \quad 10$$

In a denominator on the right second term in the equation (10), when TMon=TSI is considered, on ratio Y of the PWM motor pulse $d_2$ becomes as below from the equation (10):

$$Y = \frac{a_{OFF}}{a_{ON} + a_{OFF}} + \frac{2}{a_{ON} + a_{OFF}} \cdot \frac{1}{TSI^3} \cdot \frac{V_P}{GR_0} \cdot (TM_{ON} - TSI) \quad 11$$

A width of the encoder pulse e is decided by the count made with the free run counter FRC in the CPU 42, and since the free run counter FRC performs a count with one fourth cycle of the system clock fclk as a basic clock, when the TMon and TSI on the right second term of the equation (11) are expressed by the count value TMonf and TSIf of the free run counter FRC, it becomes as:

$$Y = \frac{a_{OOF}}{a_{ON} + a_{OFF}} + \frac{2}{a_{ON} + a_{OFF}} \cdot \frac{1}{TSI^3} \cdot \frac{V_P}{GR_0} \cdot \frac{4}{f_{CLK}} \cdot (TM_{ON}f - TSIf) \quad 12$$

Accordingly, a set value PWMRo to the PWM register PWMR becomes as shown below:

$$PWMR_0 = \frac{a_{OFF}}{a_{ON} + a_{OFF}} \times 2^{12} + \frac{1}{a_{ON} + a_{OFF}} \cdot \frac{1}{TSI^3} \cdot \frac{V_P}{GR_0} \cdot \frac{2^{15}}{f_{CLK}} \cdot (TM_{ON}f - TSIf) \quad 13$$

When the right hand first and second terms in the equation (13) are expressed by CBIAS and PRATE respectively, it is shown as:

$$PWMR_0 = CBIAS + PRATE(TM_{ON}f - TSIf) \quad 4$$

Now, a description will be made on a method for obtaining the acceleration $\alpha$ on when electricity is applied to the motor and the deceleration $\Delta$ off when electricity is not turned on to the motor at the point (F) illustrated in FIG. 4.

In FIG. 8, at the time of $K_2$ when a speed has become a desired velocity V, duty ratio of the PWM motor pulse d is set 100% until a next edge detecting time point $K_3$ of the encoder pulse e to make a state of full power electricity application, and then, output of the PWM motor pulse d is prohibited until a next encoder pulse edge detecting time point $K_4$ from the time point $K_3$ to maintain a state in which electricity is not turned on so that measurement for acceleration and deceleration can be performed. When it is assumed that the speed has been changed from V to $V_1$ at the time point of $K_3$, the acceleration $\Delta_{on}$ at this time is given by the following equation:

$$a_{ON} = \frac{V_1 - V}{\Delta t_1} = \frac{TSI - TSI_1}{TSI \cdot TSI_1 \cdot \Delta t_1} \cdot \frac{V_P}{GR_0} \quad 15$$

In the denominator of the equation (15), when $$TSI_1 \approx TSI, \, \Delta t_1 \approx \frac{TSI}{2},$$

approximates to each other, the equation (15) is shown as:

$$a_{ON} = \frac{(TSI - TSI_1)}{TSI^3} \cdot \frac{2V_P}{GR_0} \qquad 16$$

When it is assumed that the speed has further changed from V1 to V2 at a time point Ko4, the deceleration $a_{off}$ is:

$$a_{OFF} = \frac{V_1 - V_2}{\Delta t_2} = \frac{TSI_2 - TSI_1}{TSI_1 \cdot TSI_2 \cdot \Delta t_2} \cdot \frac{V_P}{GR_0} \qquad 17$$

, wherein when $$TSI_1 \approx TSI, \; TSI_2 \approx TSI, \; \Delta t_2 = \frac{TSI}{2}$$

are approximated to each other, it will be shown as follows:

$$a_{OFF} = \frac{(TSI_2 - TSI_1)}{TSI^3} \cdot \frac{2V_P}{GR_0} \qquad 18$$

Accordingly, if the CBIAS and PRATE in the equation (14) are substituted for $a_{on}$ and $a_{off}$ in the equations (16) and (18), they will be shown as:

$$CBIAS = \frac{TSI_2 - TSI_1}{TSI - 2TSI_1 + 2TSI_2} \cdot 2^{12} \qquad 19$$

$$PRATE = \frac{1}{TSI - 2TSI_1 + 2TSI_2} \cdot \frac{2^{14}}{f_{CLK}} \qquad 20$$

In the same manner as above, if the equations (19) and (20) are shown by count values TSIf, TSI$_1$f and TSI$_2$f of the free run counter FRC, they will be shown as:

$$CBIAS = \frac{TSI_2f - TSI_1f}{TSIf - 2TSI_1f + 2TSI_2f} \cdot 2^{12} \qquad 21$$

$$PRATE = \frac{1}{TSIf - 2TSI_1f + 2TSI_2f} \cdot 2^{12} \qquad 22$$

The most suitable parameter in the control of a constant speed scanning (B) can thus be obtained by calculating the values in the above equations.

In the control operation as described above, by counting the pulses which are generated corresponding to the speed of revolution of the motor which moves the scanning system in the forward and backward movement, a timing to start braking the scanning system in the backward movement can be obtained to stop the scanning system at its home position. Accordingly, switches and wiring for detecting a braking position can be omitted, and without having any effect arising from the change in load of torque caused by curvature of mirror, aged deterioration of bearing, adhesion of dust in the scanning system, a practically required position for stopping the scanning system can be judged by actuating the brake at a proper position. Since the method for counting the pulse differs between the cases when the scanning system is moved forward and when it is moved backward, even if a returning action of the scanning system is conducted with full power and in high speed to shorten a predetermined time for a multiple sheets of copying, it can be fully complied with a rise in frequency of pulses to easily accomplish the software control.

The pulse which is generated synchronously with the rotation of the motor is utilized for judging the speed of the motor, however, another pulse to apply electricity to the motor is set in order to rotate the motor at a predetermined speed corresponding to the judgment made, and the duty ratio is controlled according to the result of the judgment made on the speed of the motor to control the motor for constant speed operation. A pulse with an optional frequency for applying electricity to the motor can thus be used aside from the pulse which is generated synchronously with the rotation of the motor. By adopting a pulse in proper frequency with less noise which is capable of closely controlling the speed of the motor, the noise can be reduced and a problem of producing different noises which are generated when the scanning system of the copying machine is driven in high magnification can be solved. Moreover, the stability for controlling the motor in the constant speed can be improved. If the pulse for applying electricity to the motor is obtained by use of a one chip micon which is provided with a PWM output port, the present invention can be fulfilled at a low cost with a simple device and a software process.

Description will now be made below on a concrete flow of control in the present invention referring to accompanying flow charts illustrated in FIGS. 9a through 11. In the following description, on edge means a change from off condition to on condition of a signal, while off edge means a change from on condition to off condition of a signal.

Figure 9A:
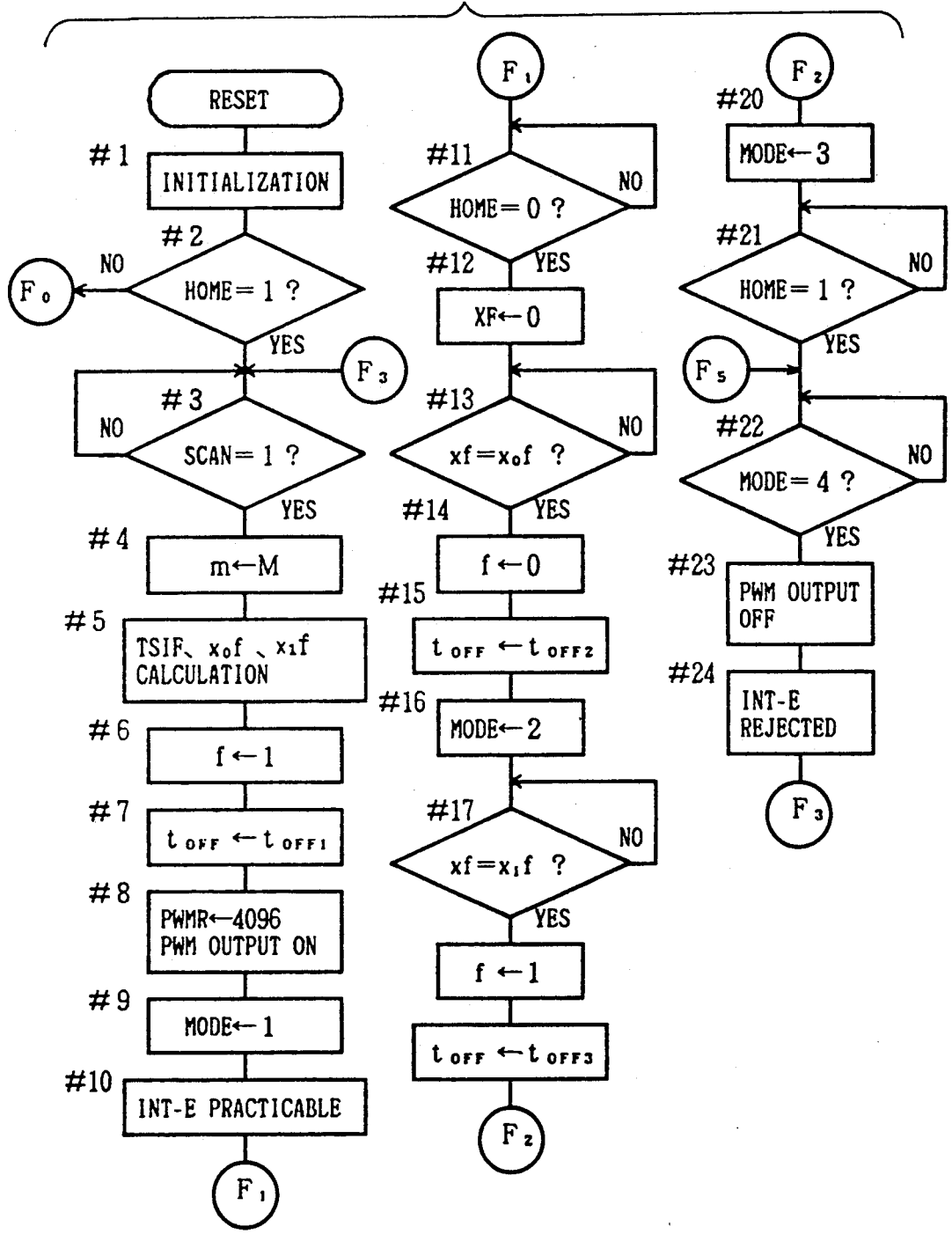
FIGS. 9a and b are flow charts showing a main routine of control by a microcomputer provided for controlling the scanning system.
Figure 9B:
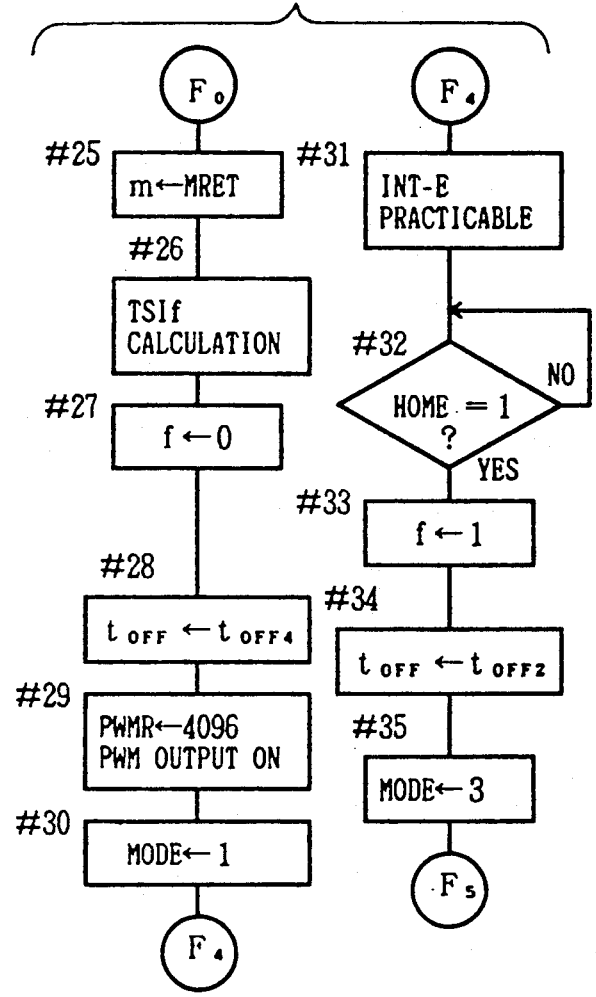

FIG. 9 shows a main routine of control by the micon 41, when an electric source is applied to reset the micon, initialization is performed at step #1, by which internal RAM 44, PWM register PWMR and the like are cleared, and the output condition of the PWM output port 47 is turned off to make the motor signal d "0". The d=0 corresponds to a condition wherein the input terminal 35b in the motor driving circuit shown in FIG. 2 turns off the motor 30 at "low", while d=1. corresponds to a condition of "high".

After the initialization, it is judged whether the home switch 34 is turned on or not at step #2. When the switch is turned on, it means that the scanning optical system 3 is at its home position, in other words, the system 3 is positioned at a scan start position, and the program proceeds to step #3 to wait for a scan request signal SCAN from an unillustrated master. When the scan request signal SCAN is emitted, a magnification M by the copy magnification signal MAG is inputted in a memory m at step #4, and an encoder pulse width TSIf for controlling a scanning speed corresponding to the copy magnification is calculated at step #5. The calculation of the TSIf is performed as shown below since the counting is performed basing on the clock of the free run counter FRC.

$$TSIf = \frac{1}{M} \cdot \frac{1}{GR_0} \cdot \frac{f_{CLK}}{4} \qquad 23$$

At step #5, a scanning distance xof and a distance xlf from the home switch to a brake start time point are also calculated. The xof is obtained from the sum of an image scanning distance calculated from a paper size PSIZE and magnification M and a preparatory scanning amount XHE (distance from the time when the home switch is turned off to the leading end of an image). The amount of scanner movement a for encoder pulse from its rise to down and from its down to rise becomes as:

$$a = \frac{V_P}{2GR_0} \quad (24)$$

Accordingly, the scanning distance xof converted into the value of pulse count at magnification M is shown as:

$$x_0f = \frac{XHE}{a} + \frac{PSIZE}{M} \times \frac{1}{a}\left(XHE + \frac{PSIZE}{M}\right) \cdot \frac{2GR_0}{V_P} \quad (25)$$

when the distance from the home switch 34 to the brake start time point is designated as $x_1$, the converted pulse count value $x_1f$ at the distance $X_1$ is shown as below from the equation (24):

$$x_1f = \frac{x_1}{a} = \frac{x_1}{V_P} \cdot 2GR_0 \quad (26)$$

In this embodiment, the PSIZE is a maximum size of sheet to be used.

At step #6, the regular/reverse rotation signal f is set at "1". The f=1 corresponds to a condition wherein the input terminal 35a in the driving circuit 51 shown in FIG. 2 makes regular rotation at "high", while f=0 corresponds to a condition to make a reverse rotation at "low". At the next step #7, a preliminarily fixed value Toff$_1$ is set to an off time memory toff in an accelerated scanning (A), which is used in an interruption subroutine of the external interruption INT-E shown in FIG. 10.

At step #8, 4096 is set to the register PWMR of the PWM. In other words, the off time control by use of the PWM output port 47 is conducted by maintaining the duty ratio of the PWM motor pulse at 100%. Here, the output condition of the PWM output port 47 is turned on, to put it briefly, making d=1, an application of electric current to the motor 30 is started also.

At step #9, MODE is made "1" to set a control mode of the accelerated scanning (A), and at step #10, the external interruption INT-E by encoder pulse e is made practicable. At step #11, in the initial stage of the accelerated scanning (A) control, the scanning optical system 3 is moved away from the home switch 34, and the home switch is turned off, then the program proceeds to step #12, wherein the counter XF for measuring scanning length is cleared. Accordingly, the counter XF counts the amount of movement of the scanning optical system 3 after it has actually started a scanning operation from the cleared condition.

At the next step #13, judgment is made whether or not a calculated scanning is performed for the scanning length by a fact whether or not the count value xf of the counter XF has reached the calculated scanning length xof. When the scanning is finished at xf=xof, the program proceeds to step #14, and by making the regular/reverse rotation signal f to "0", a braking condition by reverse driving under the condition of regular rotation is set. At step #15, a preliminarily fixed value Toff$_2$ for deciding a braking force is set to the off time memory toff, and at step #16, MODE is made 2 to set a control mode of the reduced speed scanning (C). Thereafter, a changeover from a state of the decelerated scanning to a state of the accelerated full power return is conducted by the subroutine of the external interruption INT-E.

At step #17, judgment is made whether or not it has reached a brake start time based on whether xf=x$_1$f, and if it has reached a brake start time point which is xf=x$_1$f, the program proceeds to step #18, and by making the regular/reverse rotation signal f to 1, a braking condition by regular driving under the condition of reverse rotation is set. At step #19, the value Toff3 preliminarily fixed for deciding a braking force at the time when the return movement is finished is set to the off time memory toff, and at step #20, a decelerated returning mode is set by making MODE=3.

Then, the program proceeds to step #21 and a judgment is made whether or not the scanning optical system 3 has reached its home position, that is, HOME=1. When it has reached the home position, the program advances to step #22, whereat judgment is made whether MODE=4 or not. This mode is set in the subroutine of the external interruption INT-E and means the end of the returning action. When MODE=4, the program proceeds to step #23 and output of the PWM output port 47 is turned off, then, at step #24, a state for prohibiting interruption is set. One round of action for reciprocating movement is thus finished at this stage, and the program returns to step #3 again to wait for the next scanning instruction from the master.

On the other hand, when the home switch 34 is turned off at step #2, the program moves to step #25, whereat a preliminarily fixed magnification MRET for a constant speed returning action is set to copy magnification memory m, and a returning action to the home position is conducted. At the next step #26, calculation of TSIf for the constant speed returning action which corresponds with the magnification MRET is performed in the same manner as that of the step #5. Accordingly, the calculations for xof and x$_1$f are not performed hereat.

At step #27, the regular/reverse rotation signal f is made to "0" so that the motor 30 is driven in reverse rotation, and at steps #28-#31, the same process as that of the steps #7-#10 are performed. However, the value Toff4 preliminarily fixed to decide a braking force for a constant speed returning action is set to the off time memory toff. At step #32, judgment is made whether the home switch 34 is turned on or not. When it is turned on, it means that the scanning optical system 3 is returned to the home position, and the program proceeds to steps #33-#35, whereat the regular/reverse rotation signal f is made "1" to perform a breaking action by a regular rotating drive under the reverse rotation in the same manner as that of the steps #18-#20. Here, the value Toff2 preliminarily fixed to decide a braking force at this time is set to the off time memory toff. Then, the program moves to step #22 to wait for the time until the braking action is finished, and thereafter, the same process are taken as described above.

Figure 10:
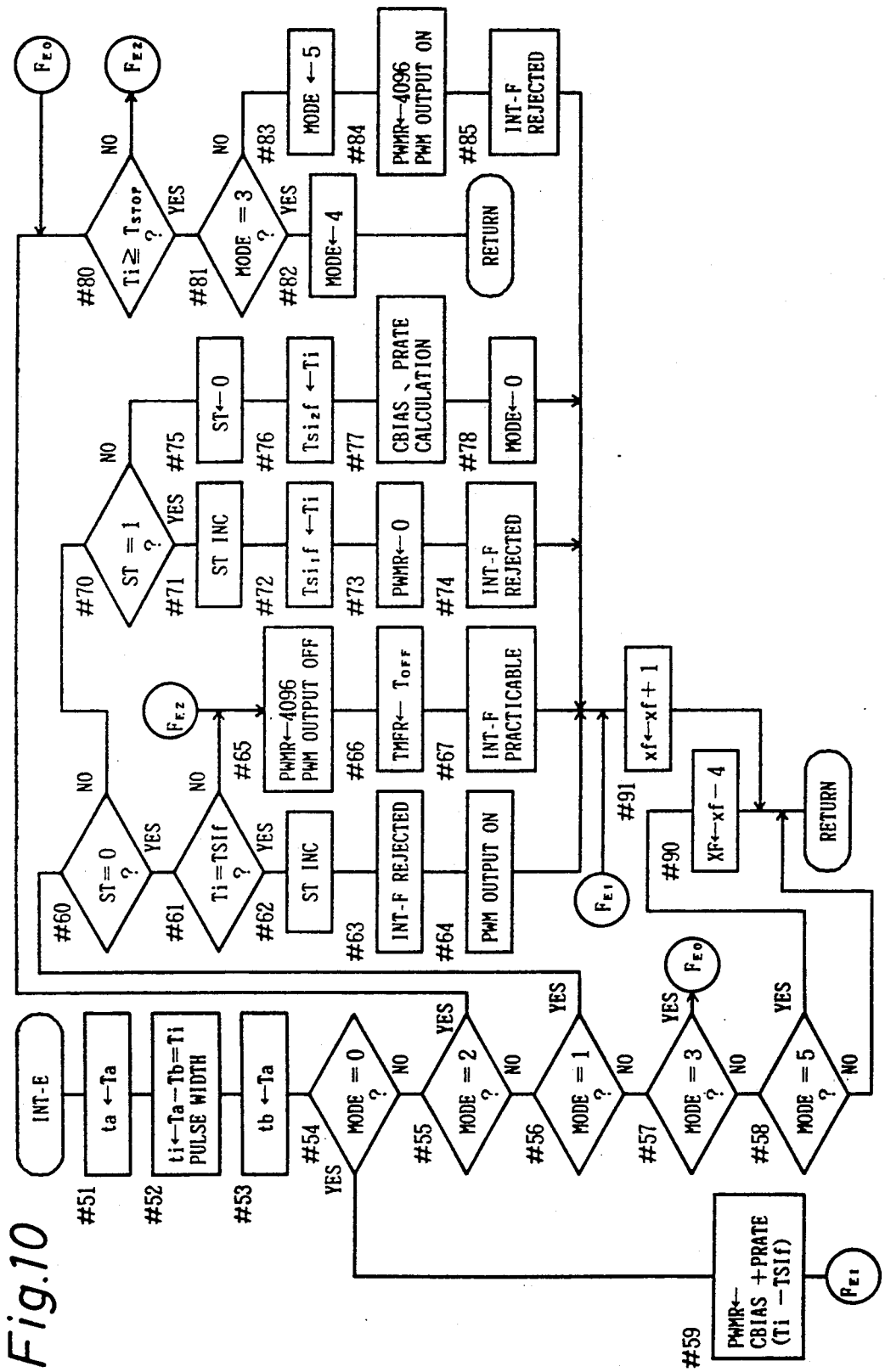
FIG. 10 is a flow chart showing a subroutine of external interruption INT-E.

Now, description will be made on the subroutine of interruption INT-E illustrated in FIG. 10.

As described above, the interruption is made corresponding to each edge when the encoder pulse e is turned on and turned off. When the interruption is made, the value Ta of the free run counter FRC which is used as a time signal at present is stored in a memory ta at step #51. Then, at step #52, the value Ti in which the time Tb of one previous encoder interruption is substracted from the Ta in the memory ta is stored in a pulse width memory ti.

At the next step #53, the Ta is stored in memory tb for processing the next encoder pulse interruption. At step #54, mode judgment is made, and if it is not the control mode (MODE=0) for the constant speed scanning (B), the program proceeds to step #55. If it is the control mode (MODE=2) for the decelerated scanning (C), the program moves to step #80, and if it is not, judgment is made whether or not it is the control mode (MODE=1) for the accelerated scanning (A). If it is the control mode for the accelerated scanning (A), the program moves to step #60, and judgment is made on a state counter ST indicating the present state under the control mode of the accelerated scanning (A). If ST=0 hereat the program proceeds to step #61, and judgment is made whether or not a measured pulse width Ti is under the TSIf calculated in the main routine. In other words, a judgment is made whether it has reached a desired speed V or not, and if it has not reached the desired speed V, the program moves to step #65, wherein 4096 is set to the PWM register PWMR to make the duty of an electric current applying pulse d to the PWM motor as 100%, and a state of output of the PWM output port 47 is turned off.

At the next step #66, the Toff which is calculated in the main routine is substituted for timer F register TMFR of the timer unit 49, and by permitting interruption of the timer F at step #67, a timer F interruption INT-F is generated after the count value set in the register timer TMFR is counted by a standard clock of one fourth of fclk.

In the case when it has exceeded the desired speed V (Ti≦TSIf) at step #61, the program proceeds to step #62, and the state counter ST under the accelerated scanning (A) is increased. At step #63, interruption by the timer F is prohibited, and at step #64, a state of output of the PWM output port 47 is turned on. Accordingly, there will be no interruption by the timer F thereafter, and enters into measurement mode of and $a_{off}$.

In the case when it is not ST=0 at step #60, the L program moves to step #70 and judgment is made whether it is ST=1 or not. If it is ST=1, the program proceeds to step #71, and the state counter ST is increased. At the following step #72, a pulse width Ti measured at present is stored in memory tsi₁f for the value TSI₁f. Then at step #73, the PWM register PWMR is made "0", that is, a state where electricity is turned off, and at step #74, internal interruption by timer F is prohibited.

At step #70, in case when it is not ST=1, the program moves to step #75 and the state counter ST is cleared to "0". At the next step #76, a pulse width Ti measured at present is stored in memory as tsi₂f for the value TSI₂f. Then, at step #77, with a method as described above, $a_{on}$ and $a_{off}$ are calculated from the pulse width TSI₁f under a state when electricity is applied and the pulse width TSI₂f under a state when electricity is turned off, from which CBIAS and PRATE are calculated. At the following step #78, a control mode (MODE=0) for constant speed scanning (B) is set.

In the case when it is a control mode (MODE=2) of decelerated scanning (C) at step #55, the program moves to step #80, and judgment is made whether or not the Ti has exceeded a pulse width Tstop which corresponds to a control finish speed of the decelerated scanning (C), that is, whether or not the speed of the scanning optical system 3 has been reduced under the speed of the control finish speed of the decelerated scanning (C). If it is exceeded, the program moves to step #65 and off time control is conducted in the same manner as the accelerated speed scanning (A) described above. If it is under the pulse widh Tstop, the program proceeds to step #81 and judgment is made whether it is the decelerated returning mode (MODE=3) or not. If it is the decelerated returning mode, the program proceeds to step #82 and a return finish mode (MODE=4) is set, and thereafter, the program is returned to the main routine from the subroutine of the external interruption INT-E.

At step #81, if the mode is not MODE=3, the program proceeds to step #83 and a full power return mode (MODE=5) is set. At the next step #84, the PWM register PWMR is set to 4096, that is, a duty ratio is set to 100%, and the PWM output port 47 is placed in an on state. Then, at step #85, a full power returning action is started by setting a state of prohibiting interruption of the timer F.

In the case when it is not the control mode (MODE=1) of the accelerated scanning (A) at step #56, the program proceeds to step #57 and a judgment is made whether it is the decelerated returning mode (MODE=3) or not. If it is MODE=3, the program moves to step #80 and the same process is performed as described above, while if it is not MODE=3, the program proceeds to step #58 and judgment is made whether it is in a full power return mode (MODE=5) or not. If it is MODE=5, the program advances to step #90 and returns to the main routine after decreasing the number of a pulse count value xf of the counter XF four by four in cooperative action with the frequency divider circuit FDC. If it is not MODE=5 at step #58, consequently when it is in a return finish mode (MODE=4), the program returns to the main routine as it is.

In the case when it is in a control mode (MODE=0) for a constant speed scanning (B) at step #54, the program moves to step #58, wherein a value which is calculated ±rom the CBIAS, PRATE and from the difference between a desired pulse width TSIf and a present measured pulse width Ti is set in the PWM register PWMR. Thereafter, the program moves to step #91 and returns to the main routine after a pulse count value xf of the counter XF is increased by one. In other words, if it is MODE=0 at step #54, the program advances to step #59 and a duty ratio of an electric current applying pulse to the PWM motor by the most suitable parameter in the control of the constant speed scanning (A) is calculated and inputted in the PWM register PWMR, and the program moves to step #91.

Figure 11:
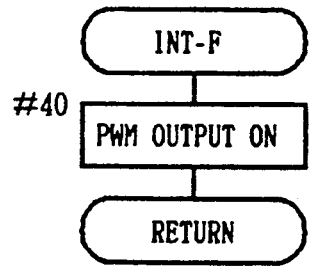
FIG. 11 is a flow chart showing a subroutine of internal interruption INT-F.

Description will now be made of the subroutine of an internal interruption by a timer F illustrated in FIG. 11. Under a state where interruption is permitted (INT-F), when only a count value set in the timer F register TMFR is counted based on the standard clock, the internal interuption INT-F occurs, and after the output of the PWM output port 47 is converted from an off state to an on state at step #40, the program returns to the main routine.

In case of a copying machine or the like which is arranged to perform preliminary scanning at the time when electric current is applied, if acceleration $a_{on}$ when electricity is applied and the deceleration $a_{off}$ when electricity is turned off are obtained at the preliminary scanning operation under constant speed scanning, the scanning optical system 3 can be properly driven and controlled to stop at its home position corresponding to an actual load torque of the scanning optical system 3 from a first round of copying operation.

The above embodiment has been described on a type of copying machine which is arranged to scan an original by movement of an optical system, however, even if an original table moving type of machine may be controlled in the same manner as described above for accurately reciprocating the original table at a faster speed. The present invention may also be applied to an operational control of a scanner in an image reading apparatus aside from the copying machine.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An original scanning apparatus comprising:
   a motor;
   a scanning system being reciprocated by said motor to scan an orginial through forward movement thereof;
   pulse generating means for generating encoder pulses corresponding to the rotation of the motor;
   pulse supplying means for supplying drive pulses to apply electric current to the motor, said drive pulse having a fixed but different frequency from that of the encoder pulse when the motor is driven at a constant speed; and
   control means for controlling the speed of the motor in accordance with the on time width of the drive pulse which is supplied by the pulse supplying means, said control means deciding a duty ratio of the drive pulse from the encoder pulse width generated at present and a reference encoder pulse width corresponding to the rotation of the motor when it is driven at a desired speed and supplying the drive pulse to the motor according to the duty ratio desired.

2. The original scanning apparatus as defined in claim 1, wherein the pulse supplying means supplied a pulse of a fixed frequency.

3. The original scanning apparatus as defined in claim 1, wherein the control means performs speed control by a pulse width modulation method.

4. The original scanning apparatus as defined in claim 3, wherein the control means performs speed control by an acceleration when electric current is applied to the motor and by a deceleration when electric current is not applied to the motor.

5. The original scanning apparatus as defined in claim 1, wherein the control means measures values of the acceleration and the deceleration at the time when the speed of the scanning system reaches a predetermined desired speed for scanning the original.

6. A scanning apparatus which is arranged to scan an original through forward movement of a scanning system reciprocated by a motor, comprising:
   pulse generating means for generating encoder pulses corresponding to the rotation of the motor;
   pulse supplying means for supplying drive pulses to apply electric current to the motor, said drive pulses having a fixed but different frequency from that of the encoder pulses when the motor is driven at a constant speed, and
   control means for controlling the speed of the motor in accordance with a time width of the drive pulse which is supplied by the pulse supplying means, said control means providing a duty ratio of the drive pulse from the encoder pulse width and a reference encoder pulse width corresponding to the rotation of the motor when it is driven at a desired speed and supplies the drive pulse to the motor according to the duty ratio decided.

7. A scanning apparatus which is arranged to scan through a forward movement of a scanning system reciprocated by a motor and to return to an initial position, comprising:
   pulse generating means for generating encoder pulses corresponding to the rotation of the motor;
   pulse supplying means for supplying drive pulses to apply electric current to the motor, said drive pulses having a fixed but different frequency from that of the encoder pulses when the motor is driven at a constant speed, and
   control means for controlling the speed of the motor by pulse width modulation in accordance with a time width of the drive pulse which is supplied by the pulse supplying means, said control means providing a duty ratio of the drive pulse from the encoder pulse width and a reference encoder pulse width corresponding to the rotation of the motor when it is driven at a desired speed, and supplying the drive pulse to the motor according to the duty ratio so that an acceleration of the scanning system occurs when electric current is applied to the motor, and a deceleration occurs when electric current is not applied to the motor.

8. A scanning apparatus comprising:
   a motor;
   a scanning system being reciprocated by the motor to scan an original through forward movement thereof;
   control means for controlling the scanning system so that the scanning system is moved forward from a standard position at a predetermined constant speed to scan the original, and after the scanning action is finished the scanning system is moved backward while providing full power to the motor until a braking action is started at a predetermined point in time in the backward movement so as to stop the scanning system at the standard position;
   pulse generating means for generating a pulse corresponding to the rotation of the motor;
   a counter for counting the pulses after the scanning system has moved away from the standard position, and
   means for causing the control means to start a braking action when the value of said counter has become a predetermined value wherein the counter performs a count up operation when the scanning system is being moved forward, and when the scanning system is being moved backward, it performs a count down operation form the value counted in the forward movement.

9. A scanning apparatus comprising:
   a motor;
   a scanning system being reciprocated by the motor to scan an original through forward movement thereof;
   control means for controlling the scanning system so that the scanning system is moved forward from a standard position at a predetermined constant speed to scan the original, and after the scanning action is finished the scanning system is moved backward while providing full power to the motor until a braking action is started at a predetermined point in time in the backward movement so as to stop the scanning system at the standard position;

pulse generating means for generating a pulse corresponding to the rotation of the motor;

a counter for counting the pulses after the scanning system has moved away from the standard position, and means for causing the control means to start a braking action when the value of said counter has become a predetermined value, wherein the counter, when the scanning system is moved backward, counts the pulse in a different manner from that at the time when the scanning system is moved forward.

10. The scanning apparatus as defined in claim 9, wherein the counter counts each pulse when the scanning system is moved forward and the counter counts a predetermined number each time pulses of the predetermined number of pulses are generated when the scanning system is moved backward.

11. A scanning apparatus which is arranged to scan through a forward movement of a scanning system reciprocated by a motor and to return to an initial position, comprising:

a source of electrical power;

pulse generating means for generating encoder pulses corresponding to the rotation of the motor;

pulse supplying means for supplying drive pulses to apply electric current from the source of electrical power to the motor, said drive pulses having a different frequency from that of the encoder pulses when the motor is driven at a constant speed;

means for providing a regenerative braking action to the motor to caused deceleration, and control means for controlling the speed of the motor by pulse width modulation in accordance with a time width of the drive pulse which is supplied by the pulse supplying means, said control means providing a duty ratio of the drive pulse from the encoder pulse width and a reference encoder pulse width corresponding to the rotation of the motor when it is driven at a desired speed, and supplying the drive pulse to the motor according to the duty ratio so that an acceleration of the scanning system occurs when electric current, from the source of electrical power, is applied to the motor, and a deceleration occurs when electric current, from the source of electrical power, is not applied to the motor.

12. A scanning apparatus which is arranged to scan an original through a forward movement of a scanning system reciprocated by a motor and to return the scanning system to a home position, comprising:

pulse generating means for generating encoder pulses corresponding to the rotation of the motor;

pulse supplying means for supplying drive pulses to apply electric current to the motor, said drive pulses having a fixed but different frequency from that of the encoder pulses when the motor is driven at a constant speed, and control means for controlling the speed of the motor in accordance with a time width of the drive pulse which is supplied by the pulse supplying means, said control means providing a duty ratio of the drive pulse from the encoder pulse width and a reference encoder pulse width corresponding t the rotation of the motor when it is driven at a desired speed and supplies the drive pulse to the motor according to the duty ratio decided;

a counter for counting pulses of the pulse generating means, and means for causing a braking action to be applied to the motor when the counter counts a predetermined number of pulses when the scanning system is being moved in a backward movement towards the home position.

* * * * *